3,733,187
PROCESS FOR CONVERTING SOLID WASTES
TO PIPELINE GAS
Herman F. Feldmann, Bethel Park, Pa., assignor to the United States of America as represented by the Secretary of the Interior
No Drawing. Filed June 7, 1971, Ser. No. 150,754
Int. Cl. C10j 3/00
U.S. Cl. 48—209
20 Claims

ABSTRACT OF THE DISCLOSURE

Solid wastes are heated to 500° C.–675° C. at 1000–3000 p.s.i.g. in presence of gas containing at least 90 mole percent hydrogen to convert said wastes to a methane- and ethane-containing gas having no condensable oils and tars. The carbonaceous residue is also free of tars and oils.

---

The invention relates to the conversion of municipal solid wastes and other wastes to high B.t.u. gas.

In view of the increasing amount of municipal solid wastes (refuse and sewage sludge) produced by an ever-expanding and consumer-oriented population, waste disposal is rapidly becoming a national problem of major importance. Present disposal systems, such as incineration and landfill, cannot be employed indefinitely. Incineration produces no useful by-products and increasingly pollutes the air. Landfilling is becoming increasingly difficult and more costly as suitable land becomes scarce. Further, leaching of filled areas eventually may cause stream pollution. Thus, there is a growing need to develop alternative systems for handling wastes.

An additional dilemma is the fact that in the not-too-distant future an energy shortage may exist, and it may be essential that new energy sources be developed as soon as possible.

Toward these ends, I have now discovered that municipal solid wastes, when heated to a temperature of about 500°–670° C. and a pressure of about 1000 to 3000 p.s.i.g. in the presence of a gas containing at least 90 mole percent hydrogen, will readily produce a high B.t.u. pipeline gas together with a dry carbonaceous residue which is free of hydrocarbon liquids such as tars and oils. The gas product is at a pressure of at least 1000 p.s.i.g., contains large quantities of methane, can contain significant amounts of ethane, and its composition is such that, when cooled to room temperature (i.e., 20–25° C.), all its hydrocarbon constituents remain in the gas phase. In other words, there are no condensable or entrained hydrocarbons such as tars and oils in the gas product whereby there is no necessity for removal equipment for such liquid hydrocarbons. In addition, the gas is exceptionally low in carbon monoxide all of which is readily methanated.

It is therefore an object of the present invention to convert solid wastes such as municipal refuse and municipal sewage sludge to a useful material.

Another object is to produce methane from such wastes..

A further object is to convert such wastes to high B.t.u. gas containing ethane as well as methane.

A still further object is to convert such wastes to a gas which contains no condensible oils or tars.

Still another object is to convert solid wastes to pipeline gas while producing very low amounts of carbon monoxide.

Other objects and advantages will be obvious from the following more detailed description of the invention.

As used throughout the specification and claims the phrase "municipal sewage sludge" means the sludge material removed from sewage in a municipal sewage primary treatment system, while the phrase "municipal refuse" means the garbage, trash, etc. collected from homes, businesses, institutions, etc. in a community, which material is commingled in the collection process, and usually dumped in designated refuse areas in such a commingled state.

In the practice of the invention solid wastes are introduced into the conversion reaction zone preferably in a shredded state to enhance the speed of the reaction. Also, if desired, glass and metal objects are first removed.

Hydrogen gas (at least 90% hydrogen) is introduced into the zone generally at a pressure of about 1000 to 3000 p.s.i.g., preferably about 1000 to 1500 p.s.i.g. The other gas constituents (no more than 10%) are inert substances or such compounds as CO and $CO_2$.

Operating temperatures in the reaction zone are maintained at about 500° to 675° C., preferably about 550° to 650° C. Since the reaction is highly exothermic, high moisture content solid wastes can be converted without external heat addition. In fact, such high moisture wastes will, in many instances, enable the process to proceed autothermically.

High pressure (at least 1000 p.s.i.g.) product gas from the reaction zone is essentially composed of methane (and, usually, ethane), CO, $CO_2$, $H_2$ and $H_2O$. Small amounts of nitrogen can also be present plus whatever other inert materials were present in the hydrogen charge to the reaction zone. When the fact that solid wastes have a high oxygen content is considered, the product gas contains CO in unexpectedly low amounts, usually less than 4 mole percent.

As the high pressure product gas is cooled to room temperature, water condenses out so that an essentially dry gas remains. In the prior art manner, $CO_2$ is scrubbed or sorbed therefrom, and the CO is methanated by reacting it with $H_2$ in the gas in the presence of a catalyst.

Since the CO is contained in low amounts essentially all of which is readily methanated, it is not necessary to convert some of it to $CO_2$ by the water gas shift reaction.

As its pressure is at least 1000 p.s.i.g., the product gas, after $H_2O$, $CO_2$ removal, etc., can be added to pipeline gas which is the fuel gas supplied to industries and homes for heating, cooking and power generation purposes.

By controlling the degree of carbon conversion in the reaction zone, the product gas, in a dry state and after methanation, can have a heating value of at least 900 B.t.u. Further, the conversion reaction is essentially free of hydrocarbon liquid product, and therefore no expensive and time-consuming separation steps in this regard are required. Still further, ethane can be produced in significant amounts, especially at a reaction temperature of about 550° C.

If desired, the dry carbonaceous residue by-product from the waste conversion reaction zone is employed to produce hydrogen gas for the reaction zone. More specifically, the carbonaceous residue is employed as fuel to produce synthesis gas (e.g., CO, $CO_2$, $H_2$ and $H_2O$) in the prior art manner by for example, passing oxygen and stream over the heated residue, or by passing steam over the residue in an electrogasifier.

The following examples illustrate the effectiveness of the process of the present invention as practiced on a particular shredded municipal refuse which has been standardized by HEW for incineration tests and which has the following composition:

Composition of Standard Municipal Refuse

| Component: | Wt. percent |
|---|---|
| Cardboard | 23 |
| Newspaper | 22 |
| Magazines | 17 |
| Brown paper | 5 |
| Waxed paper | 5 |
| Plastic coated paper | 5 |
| Raw potatoes | 23 |
| Total | 100 |

Approximate ultimate analyses:

| | |
|---|---|
| Carbon | 45.2 |
| Hydrogen | 6.1 |
| Oxygen | 41.1 |
| Nitrogen | 0.5 |
| Sulfur | 0.2 |
| Ash | 6.9 |
| Total | 100.0 |

Moisture, 23%.

EXAMPLE 1

Varying amounts of samples of the above waste were separately tested in a 1000 ml. batch autoclave. In each test a gas containing 98 mole percent $H_2$ was charged to the autoclave, and the reaction was conducted at 650° C. for 1 hour. No liquid hydrocarbon products were formed. The results were as follows:

| | Test A | Test B | Test C |
|---|---|---|---|
| Weight of solid charge (gms.) | 10 | 20 | 80 |
| Hydrogen charge (moles) | .87 | .87 | .46 |
| Final operating pressure (p.s.i.g.) | 1,200 | 1,500 | 2,750 |
| Percent conversion of carbon in solid charge to gas | 60.0 | 66.4 | 45.8 |
| Percent conversion of carbon in solid charge to hydrocarbons | 43.4 | 49.7 | 23.3 |
| Percent conversion of carbon in solid charge to CO | 8.0 | 5.0 | 8.0 |
| Percent conversion of carbon in solid charge to $CO_2$ | 8.8 | 11.5 | 14.6 |
| Product gas analysis, mole percent $H_2O$-free, $CO_2$-free basis: | | | |
| $H_2$ | 80.9 | 68.8 | 25.3 |
| $N_2$ | 2.0 | 1.5 | 0.8 |
| CO | 3.0 | 3.1 | 1.0 |
| $CH_4$ | 12.1 | 23.0 | 71.1 |
| $C_2H_6$ | 2.0 | 3.6 | 1.0 |

As can be seen from these tests the gas becomes richer in methane as the hydrogen-to-solid charge ratio is decreased. Also, the degree of conversion of the carbon in the solid charge generally decreases as the hydrogen-to-solid charge ratio decreases. In many instances a lower carbon conversion is desirable in that the residue will then be rich in carbon and can therefore be readily employed as fuel to produce the hydrogen charge for the process in which case the only external feeds will be air, water, and garbage.

With further regard to Example 1, it can be seen that a gas containing more than 3.5% ethane can be produced at 650° C. In a continuous operation wherein gas-solid contact times are substantially reduced in comparison to the batch operation of the example, production of the more valuable ethane can be further increased in that shorter contact times prevent any ethane product from being subsequently converted to methane while still in the reaction zone.

EXAMPLE 2

80 grams of the above mentioned HEW standard municipal waste was charged to the batch autoclave of Example 1 with .46 mole of hydrogen. The charge was heated for 60 minutes at 550° C. The average pressure in the autoclave was about 1300 p.s.i.g. No liquid hydrocarbons were formed. 53.3% of the carbon in the solid charge was converted to gaseous products, which product, on a $H_2O$-free and $CO_2$-free basis, consisted of (mol percent) 32.8% $H_2$, 3.4% CO, 52.6% methane and 11.2% ethane. After methanation of the CO, the gas consisted of 25.2% $H_2$, 62.3 methane and 12.5 ethane percent with a heating value of 936 B.t.u.

As can be seen from Example 2, at a relatively low reaction temperature (550° C.), the gas becomes enriched with high B.t.u. ethane. Yet, the reaction product is still free of hydrocarbon liquids. In comparison, at such a lower temperature, it is practically impossible to hydrogasify coal at pressures of 1000 p.s.i.g. and higher.

In a further more general comparison to prior art high pressure coal hydrogasification processes wherein the hydrocarbon product is all gaseous with no condensable oils and tars, the present invention operates at much lower temperatures.

Other solid wastes such as carbohydrate-containing industrial, agricultural and farming wastes, including corn stalks and cow manure, can also be converted to a high B.t.u. gas by the process of the present invention.

I claim:

1. A process for converting solid wastes to gas, said wastes selected from the group consisting of municipal refuse, municipal sewage sludge, and carbohydrate-containing, agricultural and farming wastes comprising:
    (a) heating said wastes to a temperature of about 500° C.–675° C. in a reaction zone;
    (b) contacting said heated wastes in said reaction zone with a gas composed of at least 90% hydrogen at a pressure of about 1000–3000 p.s.ig.;
    (c) removing from said zone a carbonacetous residue reaction product free of hydrocarbon liquid; and
    (d) removing from said zone a product gas at a pressure of at least 1000 p.s.ig., said product gas being essentially free of condensable or entrained hydrocarbon oils and tars, said product gas containing $CH_4$, CO, $CO_2$ and $H_2O$.

2. The process of claim 1 wherein said waste is municipal refuse.

3. The process of claim 1 wherein said heating temperature is about 550° C.–650° C.

4. The process of claim 1 wherein said pressure is in about 1000–1500 p.s.i.g.

5. The process of claim 1 wherein said product gas contains ethane.

6. The process of claim 2 wherein said heating tempature is about 550–650° C.

7. The process of claim 2 wherein said pressure is about 1000–1500 p.s.i.g.

8. The process of claim 2 further including treating said product gas by the steps consisting essentially of cooling said product gas to condense out said $H_2O$, removing said $CO_2$ from said gas, and methanating said CO.

9. The process of claim 3 further including treating said product gas by the steps consisting essentially of cooling said product gas to condense out said $H_2O$, removing said $CO_2$ from said gas, and methanating said CO.

10. The process of claim 3 wherein said pressure is about 1000–1500 p.s.i.g.

11. The process of claim 4 wherein said gas contains ethane.

12. The process of claim 6 wherein said gas contains ethane.

13. The process of claim 7 wherein said heating temperature is about 550°–650° C.

14. The process of claim 9 wherein said gas contains ethane.

15. The process of claim 10 wherein said gas contains ethane.

16. The process of claim 12 wherein said temperature is about 550° C.

17. The process of claim 14 wherein said temperature is about 550° C.

18. The process of claim 14 wherein said waste is municipal refuse.

19. The process of claim 15 wherein said temperature is about 550° C.

20. The process of claim 15 wherein said waste is municipal refuse.

References Cited

UNITED STATES PATENTS

| | | | |
|---|---|---|---|
| 927,418 | 7/1909 | Loomis et al. | 48—209 |
| 1,189,638 | 7/1916 | Testrup et al. | 48—209 |
| 2,654,663 | 10/1953 | Gorin | 48—210 X |
| 2,738,311 | 3/1956 | Frese et al. | 48—210 X |
| 2,840,462 | 6/1958 | Gorin | 48—203 X |
| 3,671,209 | 6/1972 | Teichmann et al. | 48—197 |

MORRIS O. WOLK, Primary Examiner

R. E. SERWIN, Assistant Examiner

U.S. Cl. X.R.

48—213